Patented May 24, 1927.

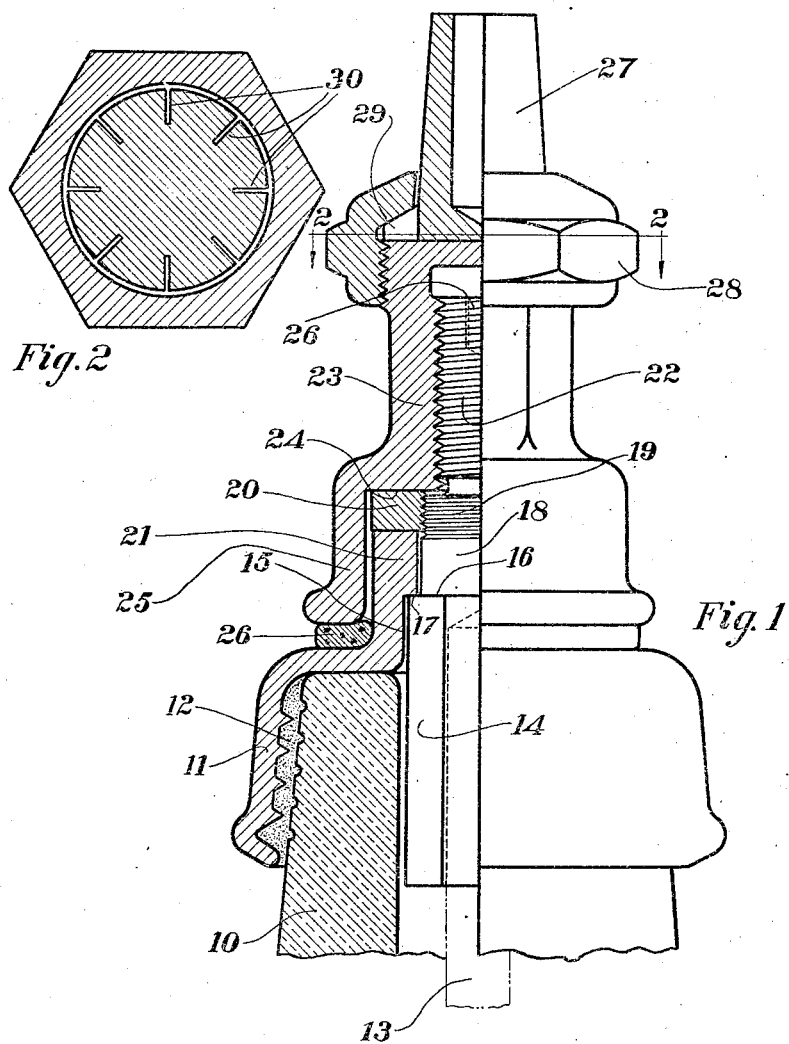

1,630,104

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

CONDUCTOR TERMINAL FOR BUSHINGS.

Application filed August 2, 1922. Serial No. 579,135.

This invention relates to terminal members for securing bushing conductors to leads extending therefrom, and for closing the end of the bushing, and has for its object the provision of devices of the class named which shall effectively close the ends of bushings, provide low resistance electrical contact between the conductors, afford easy means of installation and replacement and be of improved construction and operation.

The invention is exemplified in the combination and arrangement of parts shown in the accompanying drawings and described in the following specification, and it is more particularly pointed out in the appended claims.

In the drawings:

Fig. 1 is a part elevation and part section showing one embodiment of the present invention.

Fig. 2 is a section on line 2—2 of Fig. 1.

The numeral 10 designates an insulator bushing of any usual and approved construction having a cap 11 secured to the end thereof by cement 12, or other suitable fastening means. A conductor 13 passes thru the bushing 10 and is provided with an angularly shaped terminal member 14 secured to the end thereof by soldering, brazing or other suitable means. The portion 14 fits into a correspondingly shaped socket 15 in the cap 11 for preventing relative rotation of the conductor and cap. The angularly shaped portion 14 is reduced to provide a shoulder 16 for engaging a shoulder 17 at the end of the socket 15. The reduced portion 18 of the terminal lug 14 is threaded as shown at 19 to receive a threaded nut 20. The nut 20 clamps the conductor member 18 to the flange 21 on the fitting 11. The terminal lug 14 is continued above the threads 19 and the upper end of the lug is provided with threads 22 which are in the same direction as, but have a coarser pitch than the threads 19 and an imperforate weather cap 23 is screwed on the threads 22 and is provided with a shoulder 24 which bears against the upper surface of the nut 20. If the surfaces between the parts 20, 21, and 24 are ground to fit closely, tight joints may be formed at this place to seal the opening in the dielectric bushing. If desired, gaskets may be placed between the parts at these points or other form of tight joint employed.

To further insure a tight seal for the interior of the bushing, the cap 23 is provided with a downwardly extending flange 25 and a gasket 26 is inserted between the lower edge of the flange and the cap 11. Where the weather cap 23 bears closely on the nut 20, it is desirable that these parts shall be separated when the weather cap is removed to prevent unscrewing the nut 20 along with the cap 23. Accidental removal of the nut 20 might result in dropping the conductor thru the bushing and thus give rise to trouble. By means of the differential threads 19 and 22 this danger is avoided. Even though the nut 20 should start to turn with the cap 23, the differential threads will separate the parts and thus release the nut before any material rotation thereof occurs.

The conductor 22 may be provided with a threaded opening 26 at its upper end for receiving a line by which the conductor is drawn thru the bushing. A terminal lug 27 bears against the upper face of the cap 23 and is held thereon by a clamp nut 28. The lug 27 is provided with a tapered flange 29 for receiving the nut 28 and this flange may be slotted as shown at 30 to afford resiliency thereto, thus permitting a closer contact for providing a low resistance electrical connection.

I claim:

1. An insulator bushing having a conductor extending therethru, differential threads of the same direction on said conductor and a pair of holding members meshing respectively with the different threads on said conductor to prevent removal of one of said members by removing the other.

2. In combination a conductor, a support thru which said conductor passes, a holding member threaded on said conductor and engaging said support, a cover member for said conductor and support threaded on said conductor and engaging said first mentioned threaded member, the threaded connection between said conductor and said first named threaded member having the same direction but a finer pitch than the threaded connection between said conductor and second named threaded member.

3. In combination a conductor, a support having an opening thru which said conductor passes, a nut threaded on said conductor and engaging said support, an imperforate cap threaded on said conductor and engaging said nut, said nut forming tight joints with said support and cap for closing the opening thru said support while the threaded connection between said cap and conductor has a greater pitch than that between said nut and conductor to cause separation of said cap and nut when said cap is removed, both threaded connections having the same direction.

4. In combination a dielectric bushing, a fitting for said bushing having an opening therethru, a conductor extending thru said bushing and fitting and having inter-engaging connection with said fitting to prevent rotation thereof in said fitting, a nut threaded on said conductor and engaging said fitting to form a tight joint therebetween, and an imperforate cap threaded on said conductor and forming a tight joint with said nut, the threaded connection between said imperforate cap and conductor having the same direction but greater pitch than the threaded connection between said conductor and nut.

5. In combination a dielectric bushing, a fitting secured to the end of said bushing and having an opening therethru, a conductor extending thru said bushing and fitting, a shoulder on said conductor, a co-operating shoulder on said fitting for limiting outward movement of said conductor, a nut threaded on said conductor and engaging said fitting to clamp said shoulders against one another, and an imperforate cap threaded on said conductor, the pitch of the threaded connection between said cap and conductor being greater than the pitch of the threads on said nut.

6. In combination a dielectric bushing, a conductor extending thru said bushing, an end cap secured to said bushing and having inter-fitting connection with said conductor to prevent rotation of said conductor in said cap, means for limiting outward movement of said conductor thru said cap, a nut threaded on said conductor for clamping said conductor in said cap, and an imperforate weather cap threaded on the end of said conductor projecting from said end cap and having engagement with said nut to form a seal for the opening in said bushing, the pitch of the threaded connection between said conductor and imperforate cap being greater than the pitch of the threads in said nut to separate said cap from said nut when said cap is removed from said conductor.

7. In combination a dielectric bushing having a conductor extending therethru, a cap for said bushing, inter-fitting means on said conductor and cap to prevent rotation of said conductor in said cap, co-operating shoulders on said conductor and cap to limit outward movement of said conductor, a nut bearing on said cap and threaded on to said conductor, an imperforate weather cap threaded on to the portion of said conductor projecting from said nut, said nut forming tight joints with each of said caps, a flange on said imperforate cap and a yielding gasket interposed between said flange and said bushing cap to provide an auxiliary seal for said bushing.

8. In combination a conductor, a support for said conductor, a holding member threaded on said conductor and engaging said support, a cover member threaded on said conductor and enclosing said first mentioned threaded member, the threaded connections between said conductor and members acting to separate said members when rotated in the same direction on said conductor.

9. In combination a dielectric bushing, a conductor extending thru said bushing, a nut threaded on said conductor for supporting said conductor in said bushing, and a closure cap threaded on said conductor and engaging said nut, the threads for said nut being of the same direction but of less pitch than the threads for said cap to cause said nut and cap to separate when rotated in the same direction on said conductor.

10. In combination a dielectric bushing having a conductor extending therethru, a cap for said bushing, a nut threaded on said conductor and engaging said cap to support said conductor in said bushing, and an imperforate closure cap threaded on a portion of said conductor projecting from said nut and forming a tight joint with said nut, the threads on said conductor for said nut and cap differing from one another to cause separation of said cap from said nut when said cap is unscrewed from said conductor even tho said nut partakes of the rotation of said cap.

In testimony whereof I have signed my name to this specification on this 29th day of July, A. D. 1922.

ARTHUR O. AUSTIN.